March 10, 1970    BO PAUL S. HEDLUND ET AL    3,499,663
AUTOMATICALLY ACTING LOAD SENSOR Filed Sept. 5, 1967      3 Sheets-Sheet 1

INVENTORS
BO PAUL SIGVALD HEDLUND
ANDERS TOMMY HELGESSON
BY
ATTORNEYS

March 10, 1970  BO PAUL S. HEDLUND ET AL  3,499,663
AUTOMATICALLY ACTING LOAD SENSOR
Filed Sept. 5, 1967  3 Sheets-Sheet 2
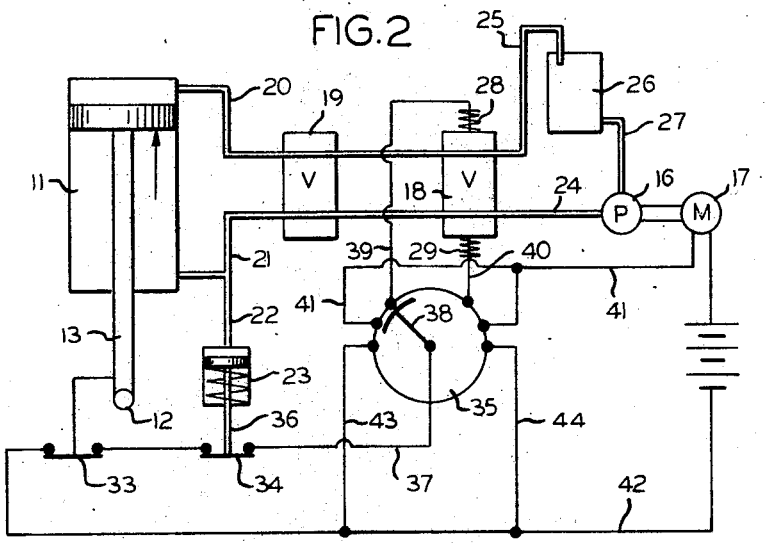
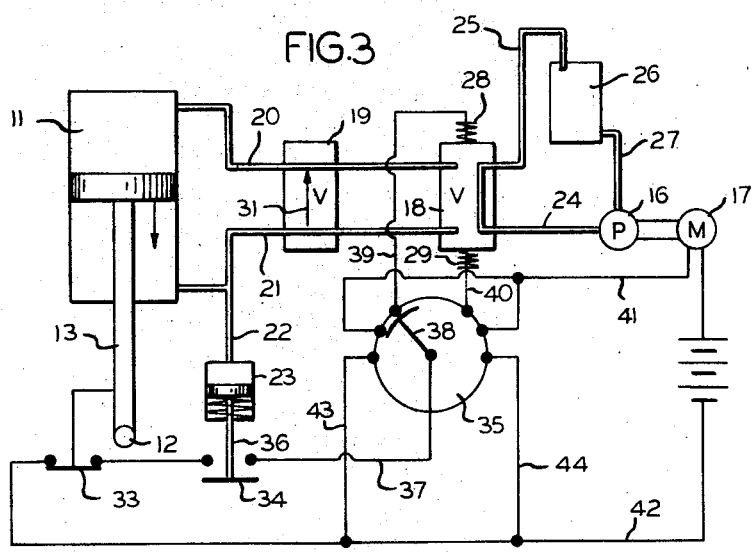
INVENTORS
BO PAUL SIGVALD HEDLUND
ANDERS TOMMY HELGESSON
BY *Mullin & Siegel*
ATTORNEYS United States Patent Office 3,499,663
Patented Mar. 10, 1970

3,499,663
AUTOMATICALLY ACTING LOAD SENSOR
Bo Paul S. Hedlund and Anders T. Helgesson, Tranas, Sweden, assignors to Aktiebolaget Tranasverken, Tranas, Sweden, a corporation of Sweden
Filed Sept. 5, 1967, Ser. No. 665,610
Claims priority, application Sweden, Sept. 6, 1966, 11,987/66
Int. Cl. B60g 11/00, 25/00
U.S. Cl. 280—124        9 Claims

ABSTRACT OF THE DISCLOSURE

An automatically acting load sensor for the wheel shaft of a bogie of a car has means for observing the shaft pressure and then releasing the idle wheels thereby decreasing the shaft and wheel pressure, and means for again elevating the idle wheels when the load has decreased below the given level.

BACKGROUND OF THE INVENTION

Figure 1:
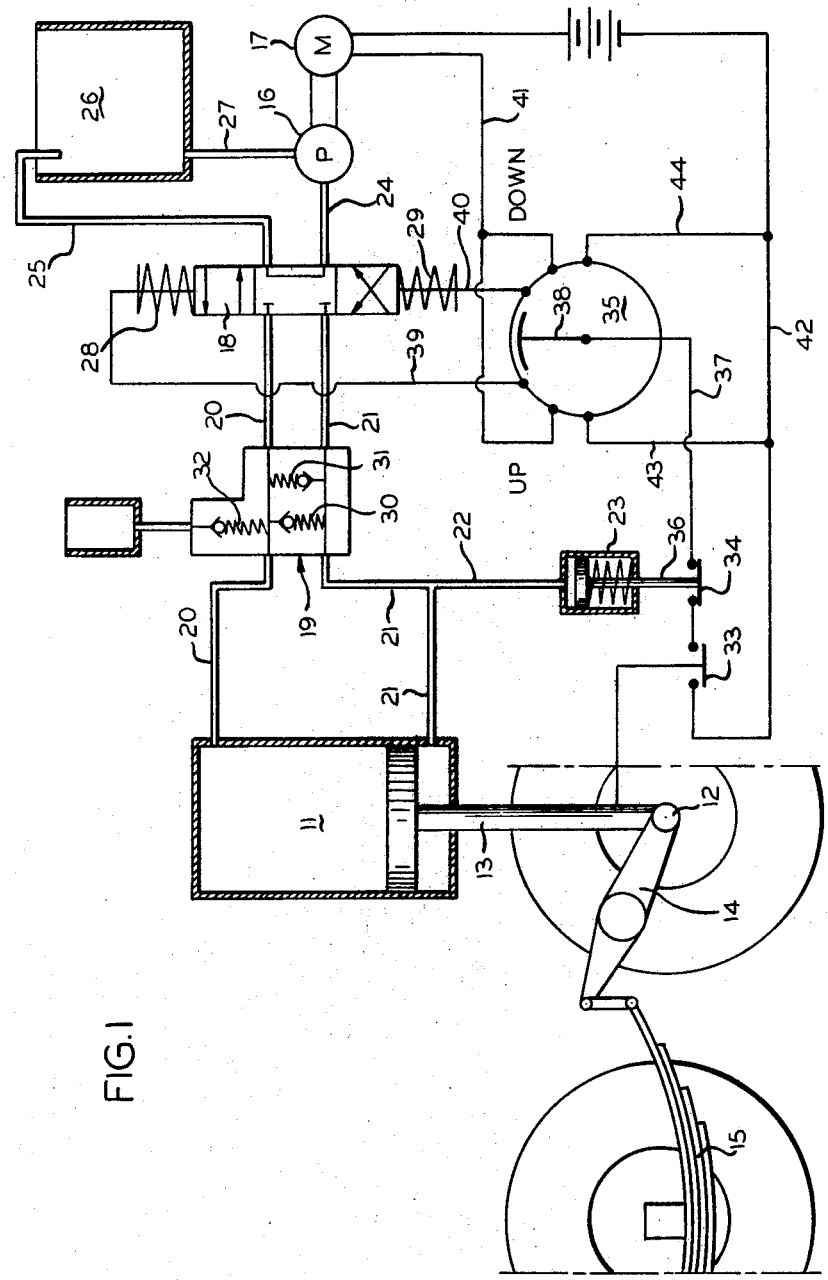

The present invention refers to an automatically acting load sensor preferably for a wheel shaft contained in the bogie of a car, said wheel shaft easily being elevated from the ground when the car is driven with a light load. The load sensor according to the invention will thereby simultaneously serve as a protector against unintentional overloading of the carriage.

The successively increasing heavy goods transported on land have urged carriages, which are provided with a so-called bogie, to be constructed with the purpose on the one hand to keep the shaft and wheel pressure of the carriages below a suitable level value, and on the other hand to increase the load capacity of the carriages to an optimum value.

However, for different reasons, it is uneconomical, when driving with a light load or with no load, to use all of the wheels contained in the bogie and it has therefore become customary that the non-driving wheels, the so-called idle wheels, when driving at no load or at a small load, are in one way or another released from their contact with the ground, usually by elevating said wheels. When it is thereafter intended to load the carriage with such a heavy load that the shaft or wheel pressure will supersede the suitable or the allowed value, the idle wheels are again let down, so that the pressure of the load carriage onto the ground is also distributed to said wheels.

However, it is extremely difficult to decide, when the shaft or wheel pressure of the carriage achieves or supersedes the said value and for reliably determining if it is necessary to use also the idle wheels. During a driving action to be made it is often necessary to measure the wheel pressure on a balance arrangement. Often no such balance is available for this measuring operation, and the driver then has, subjectively, to decide the weight of the load. There is, in such cases, always a risk that the idle wheels are used unnecessarily, when it should have been required only to use the driving wheels of the bogie, as well as that the carriage is driven with too high a shaft pressure, the idle wheels thereby being in their elevated position.

If the idle wheels are used unnecessarily when driving with light load, the tires of the idle wheels will be subjected to an unnecessary wearing at the same time as the driving costs are somewhat increasing also for other reasons.

If the carriage is driven with too high a shaft pressure, the carriage is subjected to the risk of being damaged due to over-load, and also the roads are subjected to sinking or even to earth slip.

It may further happen that the driving wheels in the carriage bogie when driving with elevated idle wheels are accidentally subjected to strong shockloads caused for instance by railway rails or by frost damages or stones or other unevenesses in the road path, and this momentary over-load of the driving wheel shaft of the bogie may thereby cause damage to the bogie or to some other part of the carriage.

The present invention, therefore intends to remove the said disadvantages and to provide an automatically acting sensing and controlling unit for bogie elevation, by means of which a given shaft pressure being achieved is automatically observed, the idle wheels thereby being released for providing a decreased shaft and wheel pressure, and which will again elevate the idle wheels, when the load has again decreased to a value below the given level.

The specific features of the invention will be apparent from the attached claims and from the following detailed specification of one example chosen as a form of execution of the invention, which will now be described in connection with the attached drawings.

However, it should be understood, that the invention should not be limited to the form of execution, thus described and shown in the drawings, but that all kinds of different modifications may occur within the frame of the invention.

Figure 4:
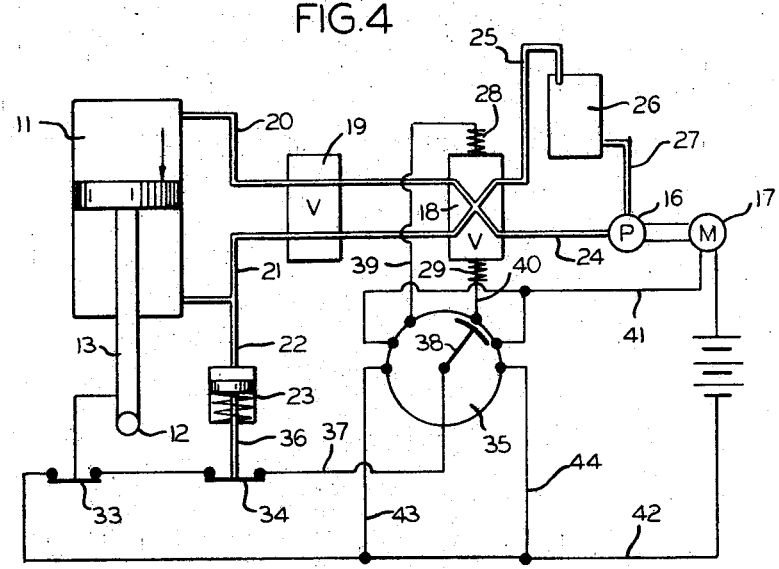

In the drawings, FIG. 1 shows schematically the arrangement according to the present invention when driving at heavy load. FIG. 2 shows schematically the arrangement during the elevation of the idle wheel shaft with the carriage lightly loaded. FIG. 3 shows in the same manner as FIG. 2 the situation occurring if the load of the carriage during the elevation of the idle wheel shaft should supersede a given value. FIG. 4 finally shows in the same way as FIGS. 2 and 3 the system during the release of the idle wheel shaft, when the carriage is lightly loaded.

The load sensing and controlling unit according to the present invention comprises a preferably hydraulically acting servo motor 11, by means of which an idle shaft 12, contained in a carriage bogie and below referred to as the idle wheel shaft, is elevated under idle driving or driving at light load. The piston bar 13 of the servo motor 11 is connected to one free end of a two-armed lever 14, the other free end of which is connected to the free end of a spring package 15, carrying the driving wheel shaft. Oil under pressure is fed to the servo motor 11 from a pump 16, which is driven by a preferably electric motor 17. Between the oil pressure pump 16 and the servo motor, there is provided a magnet controlled four-way valve 18, the function of which will be described later on. Further a shock load and compensation valve 19 is interconnected between the magnet controlled valve 18 and the servo motor 11. Two oil pressure conduits 20 and 21 run from the servo motor 11 into the shock load valve, one of which 20 runs from the upper part of the hydraulic cylinder, and the other one 21 runs from its lower part of the hydraulic cylinder, said branch conduit running to a pressure watcher 23, the function of which will also be further described below. The two main conduits 20 and 21 run through the shock load and compensation valve 19 and from the out-put side of said valve 19 into the magnet controlled four-way valve 18. This valve 18, on its out-put side, is provided with two connections for oil pressure conduits, one of which 24, below referred to as the pump conduit, runs to the hydraulic pump 16, whereas the other one 25, below referred to as the evacuation conduit, runs into the upper part of a pressure oil container 26. From the pressure oil container 26 a feeder conduit 27 for oil under pressure runs into the hydraulic pump 16.

The magnet controlled four-way valve is provided with two control magnets 28 and 29, respectively, by means of which the valve can be moved into either one of three different positions. The upper magnet 28 in the drawing, below referred to as the elevation magnet, when energized, will displace the piston of the valve in such a way that the main conduits 20 and 21 of the servo motor 11 will be connected to the evacuation conduit 25 and to the pump conduit 24, respectively. Thereby, a pumping circuit is opened, running from the pump 16 through the pump conduit 24, the main conduit 21, the servo motor 11 and thereafter from said servo motor through the main conduit 20 and the evacuation conduit 25 back to the pressure oil container 26, hydraulic oil thus being fed into the hydraulic pump 16 over the feeder conduit 27.

When, on the other hand, the lower magnet 29 in the drawing, below referred to as the release magnet, is energized, the piston of the valve 18 is displaced in such a way that the upper conduit 20 of the servo motor 11 is connected to the pump conduit 24, whereas the lower main conduit 21 of the servo motor is connected to the evacuation conduit 25. Thereby, a pressure oil circuit will be opened, running from the pump 16 through the pump conduit 24, diagonally through the valve 18 and into the servo motor 11 through the upper main conduit 20, and further from the servo motor through the lower main conduit 21, diagonally through the valve 18 and over the evacuation conduit 25 back to the pressure oil container 26, from which oil under pressure is fed to the pump 16 over the conduit 27.

If neither one of the two control magnets 28 and 29 of the four-way valve 18 is energized, the piston of the valve 18 will automatically assume a neutral position, in which both of the main conduits 20 and 21 of the servomotor 11 are shut off tightly within the valve 18, whereas the pump conduit 24, however, is connected to the evacuation conduit 25. Thereby a closed hydraulic system is obtained, running from the pump 16 through the pump conduit 24, through the piston of the valve 18 and into the pressure oil container 26 over the evacuation conduit 25, and the system is then completed by oil being introduced into the pump through the feeder conduit 27. The servo motor 11 and the main conduits 20 and 21, on the other side, are free of any kind of movement of oil, provided that the carriage is not over-loaded above a given level, or that suddenly shock loads occur.

The shock load and compensation valve 19 protects the arrangement against damages due to suddenly occurring lowering of the idle wheel shaft in the case of the shaft or wheel pressure of the carriage superseding a given maximum value.

The shock load and compensation valve 19 comprises three one-way valves, one of which 30 makes a movement possible from the upper main conduit 20 of the servo motor to its lower main conduit 21; whereas a second valve 31 allows for movement in the opposite direction, that is, from the lower main conduit 21 of the servo motor to its upper main conduit 20. The two valves 30 and 31 form the shock load valves, which are set to such a value that the idle wheel, when subjected to an over-load or a suddenly occurring shock load, may be elevated or lowered independently of the position of the four-way valve 18, also when the movement through the main conduits 20 and 21 is shut off.

When the driving wheel is subjected to an increased load, this will act upon the lever 14 in such a way, that the piston bar 13 of the servo motor be subjected to a downwardly directed force, the pressure in the conduit 21 thereby increasing. If the pressure should, thereby, increase to such a degree that this change of pressure corresponds to an over-load of the driving wheel shaft, the over-load valve 31 will be opened, and liquid will move from the lower part of the servo motor through the conduit 21, the over-load valve 20 and into the upper part of the servo motor 11. If, on the other hand, the driving wheel is subjected to a suddenly occuring decrease of pressure, for instance due to the wheel passing a depression in the ground, the contrary will take place, viz the piston bar 13 will be subjected to an upwardly directed force, and the over-load valve 30 will be opened, and liquid will move from the upper part of the container through the conduit 20, the valve 30 and the conduit 21 into the lower part of the servo motor 11.

Thereby, dangerous shock loads on the wheel shafts and other mechanical parts are avoided or essentially decreased, and an over-load of the driving wheel will also be avoided, because such an over-load will immediately result in the idle wheel being lowered and the load being distributed equally or substantially equally on the driving wheel and the idle wheel.

An increase of the fluid pressure in the conduit 21, however will cause the pressure in the branch conduit 22 to increase, with the consequence that a resiliently loaded piston in the pressure watcher 23 will be pressed inwardly, and a lack of liquid will exist in the hydraulic circuit. For this purpose, there is provided a compensation valve 32, which, by a conduit, is in connection with a pressure oil container. When, thus, a lack of fluid occurs in the circuit containing the conduits 20, 21 and 22, the valve 32 will be opened, and such a quantity of the hydraulic liquid will be fed to the said circuit, that this lack is compensated for.

For controlling the load sensing device an electric unit is provided, comprising a position switch 33 directly connected to the servo motor 11, an over-load switch 34, connected to the presssure watcher 23, a control device 35, and an electric motor 17 driving the hydraulic pump.

The position switch 33 in some suitable way is connected for instance to the piston bar 13, of the servo motor 11 and has for its purpose to open automatically the electric circuit, for instance when the idle wheel is in its lower position. However, it is advantageous that this position switch 33, when required, should be closed manually also when the idle wheel is lowered. When, due to a decrease of the load of the driving wheel, the piston bar 13 is moved upwardly somewhat, then also the position switch 33 will be moved upwardly into its closed position.

The pressure watcher 23 contains a unit of a piston and a cylinder, said unit being resiliently loaded and may suitably be set for action only when a given value is superseded. The over-load switch 34 is directly or indirectly connected to the piston bar 36 of the pressure watcher, and this switch 34 is normally closed, but it will open when the pressure in the conduits 21 and 22 gets too high, so that the resiliently loaded piston will no longer have any possibility of compensating for this pressure, but the piston bar 36 of the pressure watcher is moved downwardly. The two switches 33 and 34 are connected in series with the constquence, that the circuit is closed only when both of said switches are closed, whereas it will be opened, when one of the switches 33 or 34 is opened.

A conduit 37 leads from the two switches 33 and 34 to a centre contact 38 in a control device 35. The centre contact 38 may be set in a neutral position such as shown in FIG. 1, or in either one of two elevated positions or lowered positions. For this purpose, a conductor 39 is drawn from the control device 35 to the elevation magnet 28 of the four-way valve, and another conductor 40 is drawn to the lowering magnet 29 of the four-way valve. The control device, further, is provided with a motor contact on the elevation side as well as on the lowering side of the control device 35, a conductor 41 running from said motor contact to the driving motor 17 of the hydraulic pump 16. From the motor 17, further, a conductor 42 is arranged to the in-put side of the couple of switches 33 and 34. In this way, a closed circuit can be obtained through the pump motor 17 as well as through the two magnets 28 and 29 of the four-way valve 18.

However, it may happen that one has a need of elevating or lowering the idle wheel also when either one of the switches 33 and 34 is open and the control device 35 is for this reason provided on its upper side as well as on its lower side with a connection coupling 43 and 44, respectively, for short circuiting the two switches 33 and 34.

The function of the arrangement will now be further described with reference to the functional wiring diagrams in FIGS. 2, 3 and 4. FIG. 1 showed the arrangement in the position, when the load has superseded a given maximum weight, stipulated by means of the pressure watcher 23, so that the idle wheel thereby had been lowered to the ground level. Thereby the position switch 33 was opened by influence of the piston bar 13, and neither the pump motor 17 nor either one of the magnets 28 and 29 of the four-way valve gets current, but all of the arrangement is set in its normal position, in which the switch 33 is open, and the centre contact 38 of the control device is in its zero position.

When the load of the carriage is changed, however, the operator moves the centre contact of the control device over to its upper position, whereby the elevation conductor 39 is connected to the motor conductor 41. When thereafter the load successively decreases, the piston bar 13 of the servo motor 11 will successively be displaced upwardly until it gets in the position in which the position switch 33 is again closed. If the load of the carriage should, in this position supersede the maximum load set in the pressure watcher 23, the over-load switch 34 will be opened, and no electric current will flow. If, on the other hand, the load of the carriage is less than the stipulated maximum load, the condition illustrated in FIG. 2 will occur. Hence, thus, the position switch 33 has been closed, and the pressure in the conduits 21 and 22 is so low, that the over-load switch has not opened. The centre contact of the control device 35 is set on its position "up," and two different circuits thereby are closed. From the couple switches 33 and 34, the one circuit runs through the conductor 37, the centre contact 38 of the control device 35, and further through the motor conductor 41, the motor 17 and back to the couple of switches 33 and 34 through the conductor 42. The other circuit runs from the switches 33 and 34 through the conductor 37, the centre contact 38 and further through the conductor 39 to the elevation magnet 28 of the four-way valve 18. This latter circuit excites the elevation magnet 28 with the consequence that the main conduits 20 and 21 of the servo motor 11 are connected to the evacuation conduit 25 and the pump conduit 24, respectively. The first mentioned circuit starts the pump motor 17, which in its turn drives the hydraulic pump 16, so that compressed fluid is pumped through the pump conduit 24, the lower main conduit 21 of the servo motor and in on the lower side of the piston of the servo motor, so that this is pressed upwardly and will elevate the idle wheel shaft 12. The liquid above the piston is evacuated through the upper main conduit 20 and the evacuation conduit 25, from which it is returned to the pressure oil container 26, which provides the pump 16 with pressure oil. As long as the centre contact 38 of the control device remains in the position according to FIG. 2, the lower part of the servo motor 11 will remain under pressure and the idle wheel shaft 12 will be kept in its elevated position. When the idle wheel shaft has reached its uppermost position, the centre contact 38 of the control device is manually or automatically moved back into its position shown in FIG. 1, whereby the pump motor 17 stops and the current through the elevation magnet 28 is opened. The four-way valve 18 thereby resets itself into its neutral position shown in FIG. 1, in which the main conduits 20 and 21 of the servo motor are tightly shut off. As long as the idle wheel shaft is not over-loaded or the centre contact of the control device is not moved into its position "down," the idle wheel shaft 12 will be kept in this position.

If, however, when the idle wheel is elevated, the load of the carriage should be too high, the case will occur, which is illustrated in FIG. 3. Due to the high load of the carriage, a pressure will be transferred to the pressure watcher 23 through the lower main conduit 21 and the branch conduit 22, said pressure being so strong that the spring of the pressure watcher can no longer compensate for it, so that the over-load switch 34 will open. Thereby the circuit through the pump motor 17 as well as through the elevation magnet 28 is opened with the consequence that the pump motor will stop and the piston unit of the four-way valve 18 will assume the normal position shown in FIG. 1. Due to the high pressure in the conduit 21, however, the shock valve 31 will open and a stream of fluid will be started from the lower part of the servo motor 11 through the main conduit 21, the shock valve 30 and the conduit 20, so that the piston with its piston bar 13 and the idle wheel shaft 12 with the idle wheels will be lowered onto the ground level. During the last part of the lowering movement, in the usual manner, the position switch 33 is opened, and when the pressure in the conduits 21 and 22 has dropped to its normal state, the over-load switch 34 is closed. Thereafter, automatically or manually, the centre contact of the control device 35 is re-set to its zero position, and the arrangement has thereafter reassumed the position shown in FIG. 1 at heavy loaded carriage.

When it is intended to load the carriage above the allowed maximum load, or when one wants otherwise intentionally to put the idle wheels down on the ground in spite of the carriage being lightly loaded, the operator manually moves the centre contact 38 of the control device 35 to its position "down," the situation shown in FIG. 4 then occurring. The piston of the servo motor 11 has been in its uppermost position, and the position switch 33 therefore is closed, and the pressure in the conduits 21 and 22 to the pressure watcher 23 is so low, that the switch 34 of the latter one is also closed. Two circuits will therefore be closed over the switches 33 and 34 and the centre contact 38 of the control device 35, one of said circuits acting on the pump motor 17 and the other one energizing the lowering magnet of the four-way valve 18. Due to this, oil under pressure will be pumped from the pump 16 through the pump conduit 24 across the four-way valve 18 and through the main conduit 20 of the servo motor into its upper part. The hydraulic piston will thereby be displaced downwardly, and the oil on the lower side of the piston will be evacuated through the main conduit 21 and the evacuation conduit 25, from which it is re-transferred to the hydraulic pump 16 over the conduit 27. When thereafter the idle wheels have reached their position close to the ground level, the position switch 33 is opened in the usual way, and the circuits through the pump motor 17 as well as the lowering magnet 29 are opened, the pump motor thereby stopping its movement and the piston of the four-way valve 18 reassuming the normal position shown in FIG. 1. Thereafter, automatically or manually, the centre contact 38 in the control device is re-positioned into its zero position. By this, the arrangement has assumed its initial position shown in FIG. 1.

However, it may happen that the idle wheel shaft 12 should, for one reason or another, be elevated in spite of the carriage being loaded above the allowed level, and the control device, for this reason, is arranged as seen from FIG. 1 in such a way that its centre contact 38 may be brought to close three different contacts, one connected into the conduit 39 which acts upon the elevation magnet 28, the second one connected to the conduit 41, which goes to the electric motor 17, and the third one connected to the conduit 43, short circuiting the two switches 33 and 34. By connecting these three contact points to each other, the idle wheel shaft 12 may be elevated although the load supersedes the given maximum value and, therefore, the over-load switch 34 is open. The centre contact 38 should thereby be constructed in such a way that this position cannot be assumed inadvertently, and suitably so, that the contact will immediately reassume its position shown in FIGS. 2 and 3, when the operator leaves hold of the contact.

Cases may also happen when the idle wheel shaft 12 must for some reason be lowered to the ground, and it may then be suitable to make a short circuiting possible for lowering of principally the same kind as the above described short circuiting coupling for elevation.

It may also happen that the driving wheel is subjected to a suddenly occuring downwardly directed force or that only the idle wheel is subjected to an upwardly directed force, and thereby an increased pressure will be created on the upper side of the hydraulic piston and in the main conduit 20. This results in the shock valve 30 opening, and oil will be pressed from the upper side of the hydraulic piston through the conduit 20, the shock valve 30 and the conduit 21 into the hydraulic cylinder on the lower side of the piston. When the piston bar 13 thereby moves upwardly, the position switch 33 is closed, but as the centre contact of the control device is in its zero position, will no change of state enter, neither as far as regards the motor 17, nor as far as regards the four-way valve.

When the shock load and the resonance wave, often connected therewith have thereafter ceased, an over-pressure will again exist on the lower side of the hydraulic piston, which propagates through the main conduit 21 and the branch conduit 22. If this over-pressure supersedes the allowed maximum pressure limit, the shock valve 31 will open, and the idle wheel will again be lowered to the groundlevel. If, however, the pressure in the conduits 21 and 22 is less than the given limit value, then the idle wheels will remain in the position, assumed at the shock until the operator by turning the centre contact of the control device again causes a lowering or a further elevation of the idle wheels.

For limitation of the risk that the idle wheels sink by their proper weight, when the centre contact of the control device 35 is in its zero position, it is suitable to mount in a hydraulic lock in the conduits 20 and 21 in series between the shock load and compensation valve 19 and the four-way valve 18.

It will be obvious to the man skilled in the art that the arrangement according to the present invention may be varied in wide limits without therefore getting outside of the frame of this invention.

It will also be obvious to the man skilled in the art, that the invention may be used not only in a bogie arrangement but also in a lot of other arrangements, where there is a risk for damages due to an over-load.

We claim:

1. An automatically acting load-sensing and controlling unit for use in a vehicle having at least one first wheel that is vertically movable through the action of a pneumatic or hydraulic servo motor and at least one second wheel that continuously engages the ground, the herein improvement comprising:
    elevating means for rendering the servo motor operative to elevate the first wheel,
    power supply means for supplying electric power to said operating means to render same operative to elevate the first wheel;
    a pressure sensitive device coupled to said servo motor and to said power supply means and responsive to the load on the second wheel exceeding a predetermined value to isolate said power supply means from said elevating means,
    thereby to interrupt the elevation of the first wheel or to prevent the retention thereof in an elevated position.

2. The automatically acting load-sensing and controlling unit set forth in claim 1, wherein the servo motor has an inlet for admitting fluid thereinto and an outlet for discharging the fluid therefrom; said pressure-sensitive device including a cylinder and piston arrangement coupled to the outlet of the servo motor, and an electric overload switch coupled between said power supply means and said elevating means and operated by said cylinder and piston arrangement.

3. An automatically acting load-sensing and controlling unit for use in a vehicle having at least one first wheel that is vertically movable through the action of a pneumatic or hydraulic servo motor and at least one second wheel that continuously engages the ground, the servo motor having an inlet for admitting fluid thereinto and an outlet for discharging the fluid therefrom, the herein improvement comprising:
    an electrically driven pressure pump selectively connected to the inlet of the servo motor or the output thereof for rendering the servo motor operative respectively selectively to elevate or lower the first wheel,
    power supply means for supplying electric power to said operating means to render same operative to elevate the first wheel,
    a pressure sensitive device including a cylinder and piston arrangement coupled to the outlet of the servo motor,
    an electric overload switch coupled between said power supply means and said elevating means and operated by said cylinder and piston arrangement, said cylinder and piston arrangement being responsive to the load on the second wheel exceeding a predetermined value to isolate said power supply means from said elevating means,
    thereby to interrupt the elevation of the first wheel or to prevent the retention thereof in an elevated position.

4. The automatic load-sensing and controlling unit set forth in claim 3 and further comprising:
    a mechanically controlled four-way valve coupled between said pressure pump and the servo motor, said valve including two control magnets having first and second and third positions, said valve in the first condition thereof rendering the servo motor operative to elevate the first wheel, said valve in the second condition thereof rendering the servo motor operative to lower the first wheel, said valve in the third position thereof having a neutral effect on the servo motor.

5. The automatically acting load sensing and controlling unit set forth in claim 4, and further comprising:
    a double acting shock load valve connected between said mechanically controlled four-way valve and the servo motor for preventing movement of fluid between the inlet and outlet of the servo motor when said pressure pump is rendered inoperative.

6. The automatically acting load sensing and controlling unit set forth in claim 5, and further comprising:
    a compensation valve coupled between said double acting shock load valve and said servo motor for adding an amount of fluid corresponding to the compression in said pressure sensitive device when said pressure pump is rendered inoperative.

7. The automatically acting load sensing and controlling unit set forth in claim 6, and further comprising:
    an electrical position switch mechanically coupled to the first wheel and electrically coupled between said power supply means and said pump device, said electrical position switch being operative to isolate said power supply means from said pressure pump when the wheel is in its lowered position and operative to couple the power supply to said pressure pump when the first wheel starts an upward movement.

8. The automatically acting load sensing and controlling unit set forth in claim 7, and further comprising:
    a control device coupled in series with said electric overload switch and said electric position switch and said power supply means and said pressure pump, said control device having a first position placing said magnetically controlled four-way valve in a first condition thereof to elevate the first wheel, said control device having a second position placing said magnetically controlled four-way valve in a second condition thereof to lower the first wheel.

9. The automatically acting load sensing and controlling unit set forth in claim 8, and further comprising: means for short-circuiting said electric overload switch and said electric position switch so that the servo motor may be influenced for elevation or lowering of the first wheel independently of the condition of said switches.

References Cited

UNITED STATES PATENTS

| | | | |
|---|---|---|---|
| 3,356,954 | 12/1967 | Gottschalk | 280—6 |
| 3,366,399 | 1/1968 | Hunger | 180—22 |
| 2,882,623 | 4/1959 | Gardner | 180—22 |
| 2,777,529 | 1/1957 | Harbers | 180—22 |

PHILIP GOODMAN, Primary Examiner

U.S. Cl. X.R.

180—22

UNITED STATES PATENT OFFICE
CERTIFICATE OF CORRECTION

Patent No. 3499663          Dated March 10, 1970

Inventor(s) Bo Paul S. Hedlund and Anders T. Helgesson

It is certified that error appears in the above-identified patent and that said Letters Patent are hereby corrected as shown below:

Column 2, line 57, after "part" insert -- . A branch conduit 22 is connected to the out-put conduit 21 from the lower part --.

Column 4, line 54, change "constquence" to -- consequence --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents